United States Patent
Chen et al.

(10) Patent No.: US 9,032,308 B2
(45) Date of Patent: May 12, 2015

(54) METHOD AND SYSTEM FOR PROVIDING CONTENT GENERATION CAPABILITIES

(75) Inventors: Andrew Chen, Austin, TX (US); Sam Decker, Cedar Park, TX (US); Patrick Barrett, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 1020 days.

(21) Appl. No.: 12/698,447

(22) Filed: Feb. 2, 2010

(65) Prior Publication Data

US 2010/0205549 A1  Aug. 12, 2010

Related U.S. Application Data

(60) Provisional application No. 61/150,150, filed on Feb. 5, 2009.

(51) Int. Cl.
*G06F 3/00* (2006.01)
*G06Q 10/10* (2012.01)
*G06Q 30/02* (2012.01)

(52) U.S. Cl.
CPC ............... *G06Q 10/10* (2013.01); *G06Q 30/02* (2013.01)

(58) Field of Classification Search
USPC .................. 715/760, 733, 742, 748, 705, 714
See application file for complete search history.

(56) References Cited

U.S. PATENT DOCUMENTS

| | | | |
|---|---|---|---|
| 5,528,490 A | 6/1996 | Hill | |
| 5,761,649 A | 6/1998 | Hill | |
| 5,999,908 A | 12/1999 | Abelow | |
| 6,029,142 A | 2/2000 | Hill | |
| 6,236,994 B1 | 5/2001 | Swartz et al. | |
| 6,757,682 B1 | 6/2004 | Naimark et al. | |
| 6,785,671 B1 | 8/2004 | Bailey et al. | |
| 6,999,962 B2 | 2/2006 | Julliard et al. | |
| 7,133,834 B1 | 11/2006 | Abelow | |
| 7,143,089 B2 | 11/2006 | Petras et al. | |
| 7,222,078 B2 | 5/2007 | Abelow | |
| 7,343,294 B1 | 3/2008 | Sandholm et al. | |

(Continued)

FOREIGN PATENT DOCUMENTS

| | | |
|---|---|---|
| WO | 2007047691 | 4/2007 |
| WO | 2007050234 | 5/2007 |
| WO | 2007059096 | 5/2007 |

OTHER PUBLICATIONS

"You're It," a blog on tagging at http://www.tagsonomy.com/, printed Dec. 12, 2007, 13 pgs.

(Continued)

*Primary Examiner* — Weilun Lo
*Assistant Examiner* — Rashedul Hassan
(74) *Attorney, Agent, or Firm* — Meyertons, Hood, Kivlin, Kowert & Goetzel, P.C.

(57) ABSTRACT

Systems and methods for providing a manufacturer portal are disclosed. More specifically, in one embodiment a content distribution system, as a central location for user generated content may also provide manufacturers with a portal to monitor, and participate in, the process of content generation and distribution. This portal may provide the manufacturers with the ability to: view generated content related to that manufacturer and to filter this user generated content utilizing a wide variety of criteria and to generate content which may be responsive to presented generated content. Content generated by a manufacturer through their portal may subsequently be incorporated into one or more retailer's site utilizing the content distribution system.

26 Claims, 13 Drawing Sheets

(56) References Cited

U.S. PATENT DOCUMENTS

| | | | |
|---|---|---|---|
| 7,409,362 B2 | 8/2008 | Calabria | |
| 7,428,496 B1 | 9/2008 | Keller et al. | |
| 7,519,562 B1* | 4/2009 | Vander Mey et al. | 705/500 |
| 7,620,565 B2 | 11/2009 | Abelow | |
| 7,620,651 B2 | 11/2009 | Chea et al. | |
| 7,720,835 B2 | 5/2010 | Ward et al. | |
| 7,908,173 B1 | 3/2011 | Hill | |
| 7,908,176 B1 | 3/2011 | Hill | |
| 7,930,363 B2 | 4/2011 | Chea et al. | |
| 7,937,391 B2 | 5/2011 | Chea et al. | |
| 8,001,003 B1 | 8/2011 | Robinson et al. | |
| 8,214,261 B2 | 7/2012 | Chen et al. | |
| 8,321,300 B1 | 11/2012 | Bockius et al. | |
| 2002/0023144 A1* | 2/2002 | Linyard et al. | 709/218 |
| 2002/0107861 A1 | 8/2002 | Clendinning et al. | |
| 2002/0112035 A1 | 8/2002 | Carey et al. | |
| 2002/0165905 A1 | 11/2002 | Wilson | |
| 2003/0088452 A1 | 5/2003 | Kelly | |
| 2004/0143600 A1 | 7/2004 | Musgrove et al. | |
| 2004/0230511 A1 | 11/2004 | Kannan et al. | |
| 2005/0044197 A1 | 2/2005 | Lai | |
| 2006/0069564 A1 | 3/2006 | Allison et al. | |
| 2006/0129446 A1 | 6/2006 | Ruhl et al. | |
| 2006/0143068 A1 | 6/2006 | Calabria | |
| 2006/0230064 A1 | 10/2006 | Perkowski | |
| 2006/0235966 A1 | 10/2006 | Rossow et al. | |
| 2006/0282326 A1 | 12/2006 | Lombardi | |
| 2007/0050245 A1 | 3/2007 | Humphries et al. | |
| 2007/0078833 A1 | 4/2007 | Chea et al. | |
| 2007/0112760 A1 | 5/2007 | Chea et al. | |
| 2007/0150537 A1 | 6/2007 | Graham | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2007/0266023 A1 | 11/2007 | McAllister et al. | |
| 2008/0004942 A1 | 1/2008 | Calabria | |
| 2008/0005103 A1 | 1/2008 | Ratcliffe et al. | |
| 2008/0005223 A1 | 1/2008 | Flake et al. | |
| 2008/0097835 A1 | 4/2008 | Weiser | |
| 2008/0109232 A1* | 5/2008 | Musgrove et al. | 705/1 |
| 2008/0133488 A1* | 6/2008 | Bandaru et al. | 707/3 |
| 2008/0140577 A1 | 6/2008 | Rahman et al. | |
| 2008/0189274 A1 | 8/2008 | Mann | |
| 2008/0201643 A1 | 8/2008 | Nagaitis et al. | |
| 2008/0222003 A1 | 9/2008 | Adstedt et al. | |
| 2008/0244431 A1 | 10/2008 | Chea et al. | |
| 2008/0301055 A1 | 12/2008 | Borgs et al. | |
| 2009/0037412 A1* | 2/2009 | Bard et al. | 707/5 |
| 2009/0063247 A1* | 3/2009 | Burgess et al. | 705/10 |
| 2009/0070228 A1 | 3/2009 | Ronen | |
| 2009/0276233 A1 | 11/2009 | Brimhall et al. | |
| 2009/0299824 A1* | 12/2009 | Barnes, Jr. | 705/10 |
| 2010/0114744 A1 | 5/2010 | Gonen | |
| 2010/0114883 A1 | 5/2010 | Chea et al. | |
| 2010/0121849 A1 | 5/2010 | Goeldi | |
| 2010/0131384 A1 | 5/2010 | Chen et al. | |
| 2010/0205549 A1 | 8/2010 | Chen et al. | |
| 2010/0205550 A1 | 8/2010 | Chen et al. | |
| 2011/0093393 A1 | 4/2011 | Chang et al. | |
| 2012/0109714 A1 | 5/2012 | Azar | |
| 2012/0179752 A1 | 7/2012 | Mosley et al. | |
| 2012/0246014 A1 | 9/2012 | Chen et al. | |
| 2012/0310831 A1 | 12/2012 | Harris et al. | |
| 2013/0007012 A1 | 1/2013 | Selkowe Fertik et al. | |
| 2013/0085804 A1 | 4/2013 | Leff et al. | |

OTHER PUBLICATIONS

Arrington, Michael "Profile: DinnerBuzz," Jun. 2005, 4 pgs., at http:///www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page_id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academiccommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, In WWW2006: Proceedings of the Collaborative Web Tagging Workshop, 2006.

International Search Report and Written Opinion for International Patent Application No. PCT/US2009/063560, mailed Dec. 31, 2009, 7 pgs.

Hoegg, R. et al., "Overview of Business Models for Web 2.0 communities", GeNeMe 2006, Dresden, Germany, Oct. 2006, 17 pgs.

Qui, G. et al. "Incorporate the Syntactic Knowledge in Opinion Mining in User-Generated Content" Zhejiang University, Apr. 22, 2008, 26 pgs.

"User Generated Content, Research Brief", Feb. 2008, produced by Resource Interactive and BazaarVoice, 7 pgs.

Office Action for U.S. Appl. No. 12/614,016, mailed Jul. 28, 2010, 12 pgs.

Office Action for U.S. Appl. No. 12/243,679, mailed Nov. 30, 2010, 14 pgs.

www.Bazaarvoice.com—Overview (http://web.archive.org/web/20070408141819/bazaarvoice.com/overview.html).

www.Bazaarvoice.com—Solution (http://web.archive.org/web/20070409104639/bazaarvoice.com/solution.html).

www.Bazaarvoice.com—Syndicate Voice (http://web.archive.org/web/20070202125252/bazaarvoice.com/SyndicateVoice.html).

Office Action for U.S. Appl. No. 12/614,016, mailed Dec. 22, 2010, 6 pgs.

Office Action for U.S. Appl. No. 12/614,016, mailed Jun. 21, 2011, 7 pgs.

Office Action for U.S. Appl. No. 12/243,679, mailed Aug. 3, 2011, 16 pgs.

Office Action for U.S. Appl. No. 12/614,016, mailed Oct. 26, 2011, 8 pgs.

Office Action for U.S. Appl. No. 12/243,679, mailed Dec. 27, 2011, 15 pgs.

Office Action for U.S. Appl. No. 12/614,016, mailed Feb. 8, 2012, 9 pgs.

International Search Report and Written Opinion for PCT Application No. PCT/2010/000288, completed Mar. 18, 2010, mailed Mar. 31, 2010, 8 pgs.

Bazaarvoice, "Sephora.com Launches "Ratings & Reviews," Bringing Even More Information Than Ever to Beauty Seekers," San Francisco, CA, Sep. 4, 2008 [retrieved Mar. 18, 2010 from URL: http://bazaarvoice.com/press-room/us-press-room/268-pressreleasephpid67], 2 pgs.

Notice of Allowance for U.S. Appl. No. 12/614,016, mailed May 9, 2012, 4 pgs.

Prospero Unveils New Hosted Community Application for Custom-Branded Rating and Reviews: PR Newswire, New York, Feb. 13, 2006, 1 pg. at http://proquest.umi.com/pqdweb?did=985933201&sid=15&Fmt=3&clientId=19649&RQT=309&VName=PQD.

(56) References Cited

OTHER PUBLICATIONS

Notice of Allowance for U.S. Appl. No. 12/243,679, mailed Jul. 5, 2012, 13 pgs.
Corrected Notice of Allowability for U.S Appl. No. 12/243,679, mailed Jul. 19, 2012, 13 pgs.
Office Action for U.S. Appl. No. 13/492,642, mailed Sep. 11, 2012, 7 pgs.
Office Action for U.S. Appl. No. 12/698,510, mailed Nov. 5, 2012, 24 pgs.
European Search Report in Application No. 10738846.4 dated Jan. 21, 2013, 5 pages.
Office Action in U.S. Appl. No. 13/492,642 dated Feb. 22, 2013, 7 pages.
European Search Report in Patent Application No. 09825479.0 dated Mar. 27, 2012, 5 pages.
Office Action for U.S. Appl. No. 12/698,510 dated Apr. 2, 2012, 25 pages.
Office Action in U.S. Appl. No. 12/698,510 mailed Jun. 18, 2014, 24 pages.
Office Action in U.S. Appl. No. 13/407,358 mailed Sep. 23, 2014, 12 pages.

* cited by examiner

○ Best Buy - Question and Answer - Mozilla Firefox     □ ☐

⟲ http://reviews.bestbuy.com/answers/3545mha/content/popup.htm?bvpage=http%3A%2F%2Freviews.bestbuy.com%2Fanswers%2F3545mha%

△ Multi room operation    0 answers

△ Can I get other streaming media , eg MLB.com?    0 answers

△ can these speakers be mounted to the ceiling and pointed down to the floor at an angle?    1 answer

△ How to enable blockbuster and music streaming.    0 answers

△ Internet Hookup?    1 answer

△ How can I connect the System wireless??    0 answers

▽ BD Wise    1 answer

Q: I am using the player with a new Samsung TV. BD Wise turns on as the manual states and sets the resolution. When I played a DVD it put it in 480?? When I manually set it to 1080P it stayed and looked great. Any idea on why BD wise would set it at 480?

Also when I played a Blueray disc BD Wise set it to 1080. It did not show whether it was 1080P or 1080i though. Should I just leave the resolution for all discs manually set at 1080P?

Category: *features*

4 days ago
by Anonymous

Answers

[SAMSUNG] Ambassador —920    [Answer Question]

0   👆   0    ⊘

A: I'm sorry you are having an issue with your device. Although with the information you have provided I do not have a solution for you (manually keeping it at 1080p would be a good idea); I will say that if you contact your local Best Buy's Geek Squad, they should be able to provide you with a live solution.
-MrSamsung 4 days ago
by MrSamsung – SamsungHQ ⧉ (read all my Q&A)    0   👆   0    ⊘

METHOD AND SYSTEM FOR PROVIDING CONTENT GENERATION CAPABILITIES

RELATED APPLICATIONS

This application claims a benefit of priority to U.S. Provisional Patent Application No. 61/150,150 entitled "Method and System for Providing Manufacturers with Content Generation Capabilities and Pertinent Statistical Data" by Andrew Chen and Sam Decker filed Feb. 5, 2009.

TECHNICAL FIELD

This disclosure relates generally to obtaining and presenting data. More particularly, this disclosure relates to the generation of content by a manufacturer and the presentation of statistical or other data to a manufacturer. Even more specifically, this disclosure relates to providing a central location or portal where a manufacturer can generate content or view statistical measures or other data related to the manufacturer.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially recommendations, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and. purchasing of products. Thus, online marketing and advertising has also become increasingly important. The use of word of mouth marketing in an online setting may therefore be an effective method. for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouthmarketing.

This view has been widely reinforced by many retailers (retailers will be used herein to refer to any type of seller of a product or service, for example both online and brick and mortar) who report that products with relatively more reviews sell better and are returned less often. Thus, user generated content (comprising any information such as text, audio, video, or other information carrying medium generated by a user who is a consumer (of goods, a product, website, service, purchaser of the product, etc.)) may be extremely important to manufacturers, retailers, or other sellers of a product (e.g., suppliers) or service (collectively referred to herein as a product) as user generated content may allow products to be differentiated and sales of products increased.

As this user generated content may include such things as user reviews, user stories, ratings, comments, problems, issues, question/answers, or other type of content which, for example, a user is allowed to compose or submit through any medium, there may be many methods and locations (for example, online or offline) where a user may be allowed to generate content and the user content generated may be provided in a wide variety of mediums or formats the distribution of this user generated content may be difficult. In fact, in many cases user generated content may be more effectively generated or gathered at one location and more effectively utilized at a different location. Thus, the effective collection and distribution of user generated content may be important to both manufacturers and retailers of products, as utilization of such user generated content may increase sales of these products. Thus, the effective collection and distribution of user-generated content may be important to both manufacturers and retailers of products, as utilization of such user-generated content may increase sales of these products.

As such, in many cases, retailers or manufacturers (e.g., suppliers) may provide customers the ability to produce such user generated content. These retailers or manufacturers may, however, produce or sell a wide variety of products. As a consequence it may be difficult to build up a critical mass of user generated content (enough to effect purchasing or other consumer decisions) with respect to any particular one product.

Every day, consumers are faced with frustrating barriers to purchasing. They get close to making a purchase decision, but are hindered by critical questions they need answered to feel like they are making an informed and confident purchase. Unfortunately, with the velocity of today's consumer marketplace, product marketing, product documentation, customer support, and channel marketing frequently fall short of consumer needs and expectations. A July 2008 study by Retail Systems Research underscores the insufficiency—52% of respondents cited that the number one challenge facing retailers today is keeping product information and availability up to date. The cost of not keeping product information up to date is diminished customer loyalty and trust, increased call center volume, missed opportunity for conversion, and, ultimately, long-term damage to the brand.

To remedy this deficiency, it may be desirable for a manufacturer themselves to provide user-generated content by answering submitted questions. Additionally, manufacturers may desire to provide user-generated content for other reasons as well. Accordingly, improved systems and methods for the collection and distribution of generated content are desired.

SUMMARY

Systems and methods for providing a manufacturer portal are disclosed. More specifically, in one embodiment a content distribution system, as a central location for user generated content may also provide manufacturers with a portal to monitor, and participate in, the process of content generation and distribution. This portal may provide the manufacturers with the ability to: view generated content related to that manufacturer and to filter this user generated content utilizing a wide variety of criteria and to generate content which may be responsive to presented generated content. Content generated by a manufacturer through their portal may subsequently be incorporated into one or more retailer's site utilizing the content distribution system.

In particular, in one embodiment, user generated content associated with a plurality of products and generated at a plurality of retailer's web sites may be received. This user generated content may be associated with a manufacturer and presented to the manufacturer through a provided portal.

In certain embodiments, this user generated content may comprise questions associated with products or categories. Questions which do not have answers or which do not have answers generated by the manufacturer may be presented to the manufacturer before other questions. A content generation tool may also be presented through the portal such that a manufacturer may generate content which may be an answer to a question. When the content generated by the manufacturer is received it may be associated with the question and presented through in association with that question at the web site where the question was generated. The answer may be displayed with a badge such as an icon or identifier associated with the manufacturer indicating the answer was provided by the manufacturer.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 6 is a depiction of one embodiment of an interface which may be utilized with a manufacturer portal.

FIG. 7 is a depiction of one embodiment of an interface which may be utilized with a manufacturer portal.

FIG. 8A is a depiction of one embodiment of an interface which may be utilized with a manufacturer portal FIG. 8B is a depiction of one embodiment of an interface which may be utilized with a manufacturer portal.

FIG. 9A is a depiction of one embodiment of an interface which may be utilized at a retailer's site.

DETAILED DESCRIPTION

Figure 1:
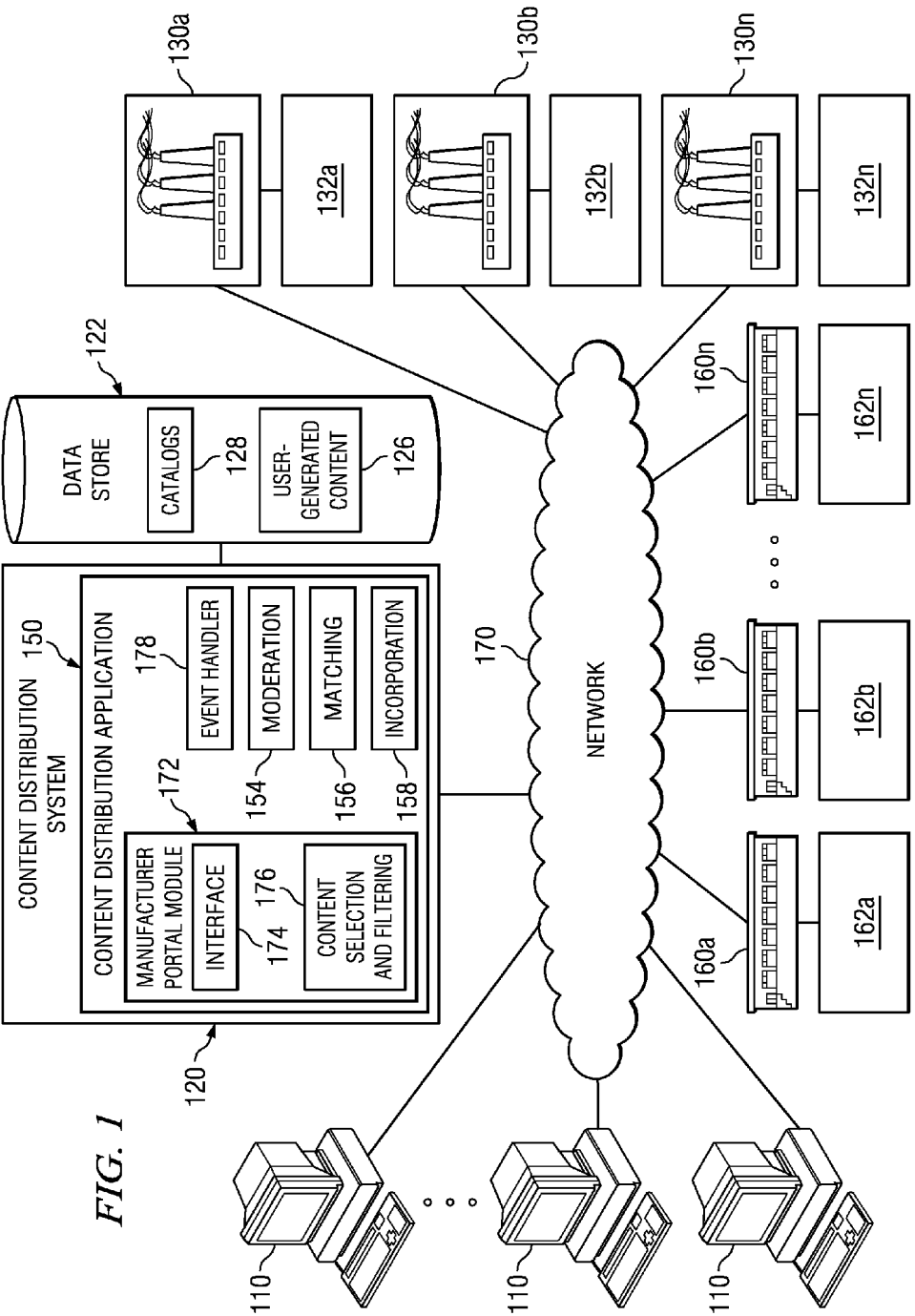
FIG. 1 is a block diagram of one embodiment of an architecture in which a content distribution system may be utilized.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises", "comprising", "includes", "including", "has", "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As discussed above the generation, distribution and use of user-generated content is increasingly important in tie modern. marketplace. As such it is possible, in many cases, for a user to generate content with respect to a product, brand, category, manufacturer, etc. at the retailer's site, the manufacturer's site or another site altogether. As the presence of this user generated content may drive sales, it is therefore desired to actively promote the generation of such content. This is particularly true with respect to certain types of content which it has proved relatively difficult to obtain.

Thus, it is possible, in many cases, for a user to generate content with respect to a product, brand, manufacturer, etc. at either the retailer's site or the manufacturer's site. As the presence of this user-generated content may drive sales, it is therefore desired to actively promote the generation of such content. This is particularly true with respect to certain types of content which it has proved relatively difficult to obtain.

One example of these types of content is what is referred to as question/answer content. This type of content may actually be generated by two (possibly distinct) users, a first user who generates a question to which he wishes to obtain the answer and one or more second users who generate an answer to this question. The question and the corresponding answers may be displayed to users which may help to drive increased sales of a product or increased traffic at a retailers or manufacturer's site.

In many cases, however, for a variety of reasons users may not be highly motivated to generate a certain type of content. In other words, there may be a participation problem. For example, users may want answers to questions, but do not themselves want to generate answers to other questions. As a consequence it may be difficult to build up a critical mass of user-generated content (enough to effect purchasing or other consumer decisions) with respect, to any particular one product and it may be apparent to a user at a site that content is lacking.

In the question/answer context, for example, it may be the case that many users have submitted questions but, because "open" questions (i.e. questions which may still have the ability to have an answer provided, regardless of whether one or more answers to the question have already been provided) may be hard to locate, dispersed throughout a site, require very specialized knowledge, etc. very few users have created answers to those questions. Thus, a user may be dissuaded from purchasing a particular product, category of products, or brand because the lack of such content.

In cases such as these it may be desirable for a manufacturer themselves to provide user-generated content by answering submitted questions. Additionally, manufacturers may desire to provide user-generated content for other reasons, as well. For example, retailers may provide the ability for users to generate questions directly to the manufacturers such that the manufacturers may provide answers to these questions or because manufacturers may desire to answer questions and be identified with the provided answer such that this type of badged answer may serve to dispel misconceptions, correct incorrect information or for a variety of other reasons.

Providing this user-generated content may, however, be somewhat problematic for these manufacturers. A manufacturer may have a variety of channels where products are sold, therefore it may be difficult to determine where questions exist which the manufacturer would desire to answer. Similarly, even if the manufacturer is aware of each of the retailers selling its products, each of the retailers may have, for example, a different structure or layout for a site. This means that it may be difficult to locate desired questions within a retailer's site or location itself.

This can lead to undesirable situations where, for example, manufacturers may not answer questions posed by users as it is too difficult to locate such questions. Exacerbating the problem, is the fact that even if manufacturers were to find and answer questions, because of the distributed nature of retailers and the differences in the type of retailers (for example, different types or structures of retailer sites) providing the manufacturer's answers to the particular retailer at which the questions was posed, integrating the answer into the site, etc. may be difficult.

It is therefore desirable to provide an easy way for manufacturers to answer questions (or generate other types of user-generated content) and disseminate this manufacturer generated content to the appropriate retailer (for example, distributing to the proper retailer site) and integrating the content with the retailer (for example, into the retailer's site). Thus, what is desired are systems and methods which allow generation of content by a user at a manufacturer and the simple distribution and incorporation of this user-generated content at appropriate retailers' sites.

To that end, attention is now directed to systems and methods to facilitate the generation of content by users. Specifically, in one embodiment, user-generated content associated with a particular manufacturer may be aggregated from multiple retailers and presented to a manufacturer in conjunction with the ability for the manufacturer to generate content in response to, or in addition to, the presented user generated content. User-generated content generated by the manufacturer can then be integrated into appropriate retailer sites at appropriate locations.

More particularly, in certain embodiments, a manufacturer portal may be provided such that user-generated content aggregated from retailer's which are related to the manufacturer may be presented to the manufacturer through the portal. The presented user-generated content may be associated with one or more products, brands, categories, etc. offered by the manufacturer or other criteria such that the presented user-generated content may be filtered according to one or more of the associated criteria. The portal may also provide the ability for the manufacturer to generate content which is responsive to the presented user-generated content or to generate other types of content. The user-generated content generated by the manufacturer may then be integrated into the web site of appropriate retailers.

Certain embodiments may therefore be especially useful in the context of certain types of user-generated content. For example, questions about one or more products of a manufacturer at may be generated different retailer' sites. These questions may be aggregated and made available to the manufacturer who may generate answers to each of these questions. The answers to each of the questions provided by the manufacturer may be distributed to the appropriate retailer (for example, the retailer at which the original question was generated) and integrated with the respective retailer's site, for example at a page corresponding to the one or more products.

Before delving in more detail into embodiments of the present invention it may be useful to discuss embodiments of systems and methods for distributing user generated content. Certain of these embodiments may be better understood with reference to U.S. patent application Ser. No. 12/243,679 entitled "Method and System for Distribution of User Generated Content" by inventors Bockius et al. filed Oct. 1, 2008, U.S. patent application Ser. No. 12/614,016 entitled "Method and System for Promoting User Generation of Content by inventors Chen et al. filed Nov. 6, 2009, and U.S. patent application Ser. No. 12/698,510 entitled "Method and System for Providing Performance Metrics" by Chen et al. filed Feb. 2, 2010, which are fully incorporated herein by reference. Specifically, embodiments of the present invention may allow content to be generated by a user at a manufacturer's or retailer's (or other) site with respect to an associated product, brand, category, etc. This content may then be distributed to one or more retailers who sell that product such that the user generated content may be incorporated into the retailer's site in conjunction with that product to allow consumers shopping at that retailer to access or view such user generated content.

More particularly, in one embodiment, users may generate and submit content on a manufacturer's or retailer's site using one or more content generation tools incorporated in the retailer's or manufacturer's site. This user generated content may be received at a content distribution system and vetted using a moderation process by which undesired user generated content may be filtered out before the undesired user generated content is incorporated into a retailer's site. User generated content associated with a particular product or category may then be distributed to one or more retailers who sell this product or category of product such that this content may be incorporated into the retailer's site in association with that product or category.

The content distribution system, as a central location for user generated content may also provide manufacturers with a portal to monitor, and participate in, this process. This portal may provide the manufacturers with the ability to: view generated content related to that manufacturer and to filter this user generated content by, for example, number of questions generated, location where the content was generated, categories of products for sale, brands, types of user generated content (for example, accepted or rejected for publishing), etc.; to generate content which may be responsive to the presented generated content; to view other types of data such as statistical data related to the user generated content; to configure alerts or other aspects of the operation of the portal as they relate to that manufacturer; etc. Content generated by a manufacturer through their portal may subsequently be incorporated into one or more retailer's site utilizing the content distribution system.

Turning now to FIG. 1, one embodiment of a content distribution topology including one embodiment of a content distribution system is depicted. Manufacturers 130 may produce, wholesale, distribute or otherwise be affiliated with the manufacturer or distribution of one or more products. Retailers 160 may be sales outlets for products made by one or more of manufacturers 130. In fact, in most cases each retailer 160 will sell products from multiple manufacturers 130. These products may be provided for sale in conjunction with one or more websites (referred to as sites) 162 provided by each of retailers 160 such that users at computing devices 110 may access the retailer's site 162 over network 170 (for example, the Internet or another type of communications network) in order to purchase these products or perform other actions.

In addition to offering the ability to purchase these products, retailer's site 162 may offer the ability for a user to access user generated content associated with the products, or categories of products, offered for sale on the retailer's site 162. By accessing such user generated content at the retailer's site 162 a user may be better able to make a purchasing decision with respect to the various products offered for sale on that retailer's site 162 or may be more inclined to buy a product, as the user feels that the product has received positive user generated content (reviews, ratings, questions/answers, etc.) from a critical mass of other users, etc. A user may thus purchase a manufacturer's product from a retailer 160 using retailer's site 162.

Retailer site 162 may also offer the ability for a user to generate content with respect to products offered for sale by retailer 160 or categories of products offered for sale. In other words, a user may utilize the retailer's site 162 to generate user reviews, ratings, comments, problems, issues, question/answers, or almost any other type of content, regarding a product or experience with the product, category, brand, manufacturer or retailer, where this user generated content may be displayed to users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user generated content with respect to a particular product, manufacturers 130 may provide manufacturer's sites 132 where these sites, or other means of collecting information from the user, can provide the ability for a user to generate content with respect to the manufacturer's products. In other words, a user may use the manufacturer's site 132 or these other means, to generate user reviews, ratings, comments, problems, issues, question/answers, or almost any other type of content regarding a product, category, brand, manufacturer, etc. usually regardless of where the user purchased the manufacturer's product.

In one embodiment, the user generated content which may be generated at a retailer's site 162 or manufacturer's site 132 may include reviews, stories, ask/answer content or any other type of content in any format which the user wishes to add regarding a product, brand or service (collectively referred to as a product herein), or category of products. Reviews may correspond to a user evaluation of a product and include ratings of product for example, a number of stars), pros and cons of the product, a descriptive title and a description of a user's experience with a product, attributes of the user generating the review (for example, demographic information), other product which compliment or may be used with the product being reviewed, or any other type of evaluation of a product or aspects of a user's experience with the product. For example, Ask/Answer content may comprise questions or answers submitted by a user, retailer or manufacturer concerning a potential purchase decision, for example regarding the capabilities or use of a product or category of products, demographic information on a user generating a question or answer. Stories may be user generated content which may pertain to open ended experiences with one or more products or categories of products which may be more tangentially related to the product than, for example, reviews.

As the amount of user generated content associated with a product or category at a retailer's site 162 may greatly affect the sale of a product (both at that site 162 and off-line purchases as well), it may be desirable to both manufacturers 130 of a product and retailers 160 who sell that product that any user generated content created in association with a product or category be displayed in conjunction with that product or category on a retailer's site 162 (which may increase revenue for both a retailer 160 and a manufacturer 130 of the product).

Content distribution system 120 may therefore be coupled to network 170 and serve to distribute content generated at both retailer's site 132, manufacturer's site 162, or another location, to retailers' sites 162 which offers these products or categories of products for sale such that the content generated by a user with respect to that product or category at the retailer's site 162 and the manufacturer's site 132 is incorporated into that retailer's sites 162 where the product or category of product is offered. Thus, content distribution system 120 allows content generated at a particular retailer's site 162 to be combined with content generated at the manufacturer's site 132 and incorporated into that retailer's site 162 in conjunction with that product, category, brand, etc.

Additionally, as manufacturers 130 may desire to view content generated with respect to their products or brands, content distribution system 120 may provide a manufacturer portal accessible by a manufacturer 130 across network 170. By accessing this portal a manufacturer may be presented with user-generated content associated with that manufacturer which was generated at any of retailer's sites 162 or manufacturer's sites 132. The user-generated content associated with the manufacturer may be filtered by the manufacturer according to a variety of criteria, such as product, brand, category, retailer, type of user-generated content, etc. such that only a desired type of user generated content may be viewed by the manufacturer. The portal may also provide the ability for the manufacturer to generate content, where this manufacturer generated content (which may also be considered and referred to as user-generated content) may be responsive to at least a portion of the presented user-generated content.

Content distribution system 120 may therefore also serve to distribute this type of user-generated content (for example, user-generated content generated by the manufacturer through the provided portal) and content generated at both retailer's site 162 and manufacturer's site 132, to retailers' sites 162 which offers these products or categories of products for sale, such that the content generated by a user with respect to that product or category at the retailer's site 162, the manufacturer's site 132 or by the manufacturer themselves 130 may be incorporated into that retailer's sites 162 where the product or category of product is offered.

Specifically, in one embodiment, if the content generated by the manufacturer is responsive to user-generated content generated at a particular retailer 160 which was presented to the manufacturer 160 through the portal, the responsive content generated by the manufacturer may only be incorporated into that retailer's site 162 where the presented user-generated content was originally generated. In certain cases, the manufacturer generated content may be incorporated in the same location and associated with the originally generated content, such that the original user-generated content and the manufacturer generated response may be associated. Thus, content distribution system 120 allows content generated at a particular retailer's site 162 to be combined with content generated at the manufacturer's site 132 and by that manufacturer 130, and incorporated into that retailer's site 162 in conjunction with that product, category, brand, etc.

By centralizing the distribution, incorporation and presentation to manufacturers of such user generated content a number of technical advantages may be achieved, especially with regards to the processing, storage and distribution of such user generated content, including the moderation of such user generated content and the formatting of such user generated content for incorporation in the sites 162 of retailers 160. Additionally, this centralization may allow for easier implementation of portals which allow manufacturers to answer questions, or generate other types of user-generated content, and integrate this manufacturer generated content with the appropriate retailer's site.

Furthermore, such a centralized content distribution system may have a number of business advantages. For example, as the sale of their products is important to retailers 160 and manufacturers 130, both manufacturers 130 and retailers 160 may pay operators of content distribution system 120 for formatting or distributing the user generated content to the retailer's sites 162 and manufacturers may pay to have the ability to have a portal through which relevant user-generated content may be presented and through which the manufacturer may themselves generate content, including content responsive to the presented user-generated content.

Content distribution system 120 will now be discussed in more detail. Content distribution system 120 may include one or more computers communicatively coupled to a network 170 and a data store 122. Data store 122 may comprise user generated content 126 and catalogs 128. User generated content 126 may be associated with one or more products or categories, where this user generated content may have been generated at manufacturer's site 132, retailer's site 162, by a manufacturer 130 through a provided portal (as will be discussed in more detail later) or at another location altogether. Catalogs 128 may comprise a set of catalogs, each catalog corresponding to a retailer 160 or manufacturer 130. A catalog may comprise a set of category identifiers utilized by the retailer or manufacturer, where each category identifier may be associated with one or more product identifiers and each product identifier may be, in turn, associated with a brand name, a product name, or any number of other desired attributes. A catalog may, for example, comprise one or more files of eXtensible Markup Language (XML). These catalogs 128 may be received from retailer 160 or manufacturer 130, for example over network 170, at a regular or semi-regular basis. For example, catalogs may be received nightly from retailer 160 or manufacturer 130. It will be apparent that each retailer or manufacturer may provide their catalogs at different times, according to different time periods or schedules, irregularly, etc.

Content distribution system 120 may also include a content distribution application 150 which comprises a manufacturer portal module 172, a moderation module 154, a matching module 156 an event handler module 178 and an incorporation module 158. Moderation module 154 may moderate (for example, filter or otherwise select) content which is, or is not to be, excluded or included, while matching module 156 may serve to match received user generated content received with a particular product or category. In one embodiment, this matching process may be accomplished using catalogs 128.

Incorporation module 158 may be configured to incorporate a tool for the generation of content into a manufacturer's portal, or a retailer's or manufacturer's site. Furthermore, incorporation module 158 may incorporate user generated content into a retailer's site 162, or other site, for display to a user. In particular, a user may generate content regarding a product or category at a manufacturer portal, manufacturer's site 132 or retailer's site 162 using a content generation tool (for example, a GUI, webpage, widget, etc.) presented on the site. This tool may be implemented or developed by operators of content distribution system 120 and provided for use with a site to facilitate the generation of content by users, or the subsequent processing, distribution and incorporation of such content by content distribution system 120. These tools may be hosted by incorporation module 158 of content distribution system 120. Thus, for example, on a page of retailer's site 162 a content generation tool may be included, such that the tool hosted at content distribution system 120 may be incorporated in the site 162 for use by a user at the site 162.

Such content generation tools can be distributed throughout a retailer's or manufacturer's site. For example, these content generation tools may be included on a site's product pages as well as the category pages which help to organize the product page. Thus, such a content generation tool may be advantageously employed to allow content to be generated in the context of the product catalog page or category page on which it was deployed. So, for example, a module that is deployed on a television product page will receive questions and answers that may be different than questions and answers received on a module deployed on a product page for a wool sweater.

In any event, the content generated by the user with respect to a product or category may be received by content distribution system 120 and stored in association with that product or category. The received content may be moderated by moderation module 154, to determine if such content should be utilized for display on a site, or may be edited for suitability. This moderation process may comprise different levels of moderation, including auto processing the user generated content to identify blacklisted users or trusted users; human moderation which may include manually classifying content or content recategorization; proofreading; or almost any other type of moderation desired. Note, however, that such moderation may or may not be employed in certain embodiments. For example, content from certain manufacturers may not undergo such a moderation process, or may undergo moderation at a different point.

This content can then be associated with a manufacturer, products or categories of products offered for sale by retailer 160 or the manufacturer 130, a user attributes of the user who generated the content, product attributes, etc., by, in one embodiment, associating the user generated content with a product identifier for a product, or a category identifier for a category, and storing the content and associations in data store 122. At least a portion of these associations may be determined using matching module 156 which may compare data received in conjunction with the user generated content (for example, product data, category data, user data, etc.) with data in a catalog 128.

Once it is decided that the user generated content is to be stored in data store 122 and allowed to be disseminated (for example, has been moderated), event handler 178 may take certain actions based on the user generated content or its associated data, such as emailing a user, sending alerts to a manufacturer that new content regarding one of their products has been received, etc. These events may be tailored to the type of content generated or other attributes of the content. For example, when a question has been generated, the event handler may alert a manufacturer or a user that an open question exists.

A manufacturer portal module 172 may comprise an interface 174 which may be one or more web pages or other type of interface such a graphical user interface (GUI) (which may accessed over network 170) allowing a user such as a marketing director affiliated with a manufacturer 130 to monitor or affect the distribution of user-generated content pertinent to them. This interface 174, may for example, utilize content selection and filtering module 176 to allow a manufacturer to run a report utilizing various criteria such as by products, categories of products for sale, brands, user generated content (for example, type of content, accepted or rejected user generated content, etc.), retailer where content was generated, etc. Specifically, content selection and filtering module 176 may be configured to select content from user-generated content 126 based upon one or more criteria associated with a user or identified by a user through interface 174. The selected user generated content can then be presented to the user through the interface 174.

Interface 174 may also incorporate a tool for the generation of content into the manufacturer portal. In particular, a user of the manufacturer portal may generate content regarding a product or category using a content generation tool (for example, a GUI, webpage, widget, etc.) presented through the interface 174 of the manufacturer portal. In certain cases, the generated content may be associated with, or responsive to, user generated content presented to the user through the interface 174 (where the presented user generated content may have, for example, be originally generated at a retailer's site 162 or manufacturer's site 132).

These content generation tools may, for example, be hosted by incorporation module 158 of content distribution system 120. Thus, a content generation tool may be included on a page presented by interface 174, such that the tool hosted at content distribution system 120 may be incorporated in the manufacturer's portal for use by a user. Such content generation tools can be present on one or more interfaces 174 presented in conjunction with the manufacturer's portal. For example, a link to such content generation tools may be placed on an interface 174 provided to the user of the manufacturer portal in conjunction with presented user generated content. By clicking on such a link the content generation tool may be incorporated into, or otherwise presented in conjunction with, the interface 174 such that the content generation tool may be utilized to generate content responsive to the originally presented user generated content. Thus, such a content generation tool may be advantageous by allowing content to be generated in the context of the originally presented user generated content.

Content generated through the manufacturer portal may be received by content distribution system 120 and stored in data store 122. The received content may be moderated by moderation module 154, to determine if such content should be utilized for display on a site, or may be edited for suitability. Alternatively, if the operators of content distribution system 120 have a trusted relationship with the manufacturer 130 no such moderation may be performed. This content can be associated with the manufacturer or user who generated the content, the original user generated content to which the received content is responsive, one or more products or categories offered for sale by retailers 160, or a wide variety of other attributes, as desired.

Accordingly, a user shopping at, for example, retailer's site 162 may access a web page or other portion of the site 162 corresponding to a particular product or category. User generated content 126 associated with that product or category may be displayed such that a user viewing a portion of the retailer's site associated with a particular product or category may have user generated content 126 associated with that product or category displayed to him. This user generated content, may, for example, have been generated at the retailer's site 162, the manufacturer's site 132 or through the manufacturer themselves utilizing the management portal. In some cases, the user generated content generated by the manufacturer which is responsive to other user generated content may be displayed in conjunction with the content to which it is responsive. Additionally, such manufacturer generated content may be identified with the manufacturer who generated such content. Thus, the display of this user generated content to the user while he is shopping, may, in turn, motivate the user to make a purchase through retailer's site 162.

Both the user generated content and a content generation tool may be provided in conjunction with one another on the retailer's site 162. Specifically, in one embodiment, the content from content distribution system 120 and a content generation tool may be incorporated into a portion of a web page of retailer's site 162 using an iframe or div tag (or another type of HTML element or tag, or another type of mechanism). This mechanism works in conjunction with a software module associated with content distribution system 120 (such as JavaScript or other set of computer readable instructions) included on the web page or at the retailer's site 162. The software module may make calls back to the incorporation module 158 on content distribution system 120 to incorporate the desired content for that page along with a content generation tool.

More particularly, in one embodiment, when a web page is loaded at retailer's site 162 the HTML for the page may load, followed by a loading of the iframe (which may be hidden), div, table, or other mechanism which is used to incorporate content from the content provider system 120. The software module provided by the content distribution system 120 may also load at this time in order to access incorporation module 158 to obtain data (e.g. reviews, stories, etc., as discussed above) for inclusion in the web page in conjunction with the mechanism (div, HTML or other element) for display of the provided content.

In one embodiment, the software module associated with content provider system 120 resident on retailer's site 162 (for example, JavaScript or other computer instructions) may be executed when the web page is loaded. This program may send data such as the product data, user data, display codes, etc. to incorporation module 158. Incorporation module 158 may utilize this data to determine user-generated content 126 to return and format this data accordingly. The software module on the retailer's site 162 receives content from the incorporation module 158 and copies the content into the element on the web page configured to display the content. Moreover, the ability to generate additional content may be offered, where the type of content generation opportunity offered may correspond to the type of incorporated content. For example, the opportunity to generate an additional review may be presented along with reviews that have been incorporated in the web page at the retailer's site.

It will be noted at this point that while embodiments discussed herein may be described with respect to the generation of content at one or more retailer's or manufacturer's sites, or a manufacturer portal, the integration of the user generated content into the retailer's site, and the presentation of content generation opportunities at a retailer's site; it should be understood that other embodiments may be utilized with equal efficacy to both integrate user generated content and present content generation opportunities at almost any site desired, whether the site be a retailer's site, a manufacturer's site, a site provided by operators of a content distribution system or another site altogether. As such, embodiments may be utilized where the generation of content occurs at a first location, the incorporation of content occurs at a second location and the presentation of content generation opportunities occurs at a third location, where the first, second and third locations may each be distinct from, or the same as, one or more of the other locations.

The provisioning of a manufacturer portal utilizing one embodiment of a manufacturer portal module will now be discussed in more detail. As discussed this portal may comprise an interface to allow a user to access user-generated content to which a manufacturer may desire to respond (for example "open" questions) and to generate responsive content. A wide variety of other data and analytics may also be provided through the manufacturer's portal. Such data and analytics may allow data pertinent to the manufacturer (for example, product data, brand data, manufacturer data, etc.) to be sliced, aggregated or analyzed according to a number of criteria. Additionally, a manufacturer may be allowed to slice, aggregate or analyze data pertinent to his competitors, competitors' products or brands as well. The data available through such manufacturer portals may drive manufacturer's participation or use of a content distribution system, benefiting operators of content distribution system, retailers, consumers, etc.

It should be noted that though various embodiments, including embodiments of content distribution system and manufacturer portals have been discussed herein, other embodiments may function effectively without the use of such a portal. For example, it will be noted that the aggregation of user generation of content from retailer's sites 162, making this content available to manufacturers 130, receiving and responsive content generated by the manufacturers 130 and distributing this responsive content to the appropriate retailer site may be accomplished through, for example, an email. This email may contain direct links to retailer's site 162 where questions pertinent to a manufacturer may be answered. This email may be sent to someone at the appropriate manufacturer 130 who may use these links to answer questions at each of the retailer's sites 162. Other means to aggregate and make available to the manufacturer user-generated content pertinent to that manufacturer, and distribute responsive content generated by the manufacturer, will be apparent after a thorough review of this disclosure. Additionally, functionality, such as data or analytics, described with respect to the manufacturer portal may also be provided in a number of other ways, including providing such data or analytics through written reports, emails, etc.

Figure 2:
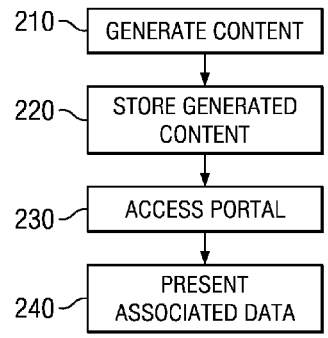
FIG. 2 is a block diagram of an architecture including a content distribution system.

Moving now to FIG. 2, a flow diagram for one embodiment of a method of providing a manufacturer portal is depicted. At step 210 users may generate content with respect to one or more products produced or provided by a manufacturer at a retailers site 162 or at the manufacturer's site 132. As discussed above, in one embodiment, this content may be questions to which a user may desire an answer or intended for a manufacturer, or another type of content. The generated content may be received and stored at the content distribution system at step 220. More specifically, the user generated content may be stored in association with a retailer identifier associated with the retailer where the content was generated, a brand identifier, a product identifier associated with the manufacturer or retailer, a category identifier associated with a category utilized by the manufacturer or retailer, attributes of the user who generated the content, attributes of the product associated with the user generated content, or other desired data which may be provided utilizing a communication from the site at which the content was generated or determined at the content distribution system.

At some point then, the manufacturer may access a manufacturer portal at step 230. This access may entail logging into the manufacturer portal using a login page. A manufacturer may have a global login that every user at the manufacturer may utilize or each user who logs in may have a particular username and password, where the user is associated with the manufacturer, such that any actions taken by a particular user on the manufacturer's portal may be tracked, or the user associated with such actions.

After accessing the manufacturer portal, data related to the user generated content associated with that particular manufacturer may be presented to the user at step 240. This user generated content may be determined by searching the user generated content stored at the content distribution system based upon one or more criteria and determining which user generated content corresponds to those criteria. For example, in one embodiment the user may select or navigate to a page that corresponds with questions that are open for that manufacturer. In other words, the user generated content may be searched to determine all open questions associated with the manufacturer with which the user is himself associated. The user may thus be presented with the number of open question for the manufacturer, where the number may correspond to the number of questions without any user answers, or the number of questions without any answers provided by the manufacturer. The user may also be presented with a list of the actual questions about its products that do not have any answers (or have less than a threshold number of answers), again where the presented questions may be questions without any user answers or without any answers provided by the manufacturer.

The interface presented to the user may also allow the user to select or otherwise submit one or more criteria. These criteria may be used to filter the user generated content in order to present only user generated content corresponding to that criteria to the user. For example, the user generated content may be filtered according to a retailer such that only content which was generated at that retailer's site 162 will be presented to the user; the user generated content may be filtered according to a product or category such that only user generated content associated with that product or category will be presented to the user; the user generated content may be filtered according to manufacturer's answers such that user generated content which does not have responsive content generated by the manufacturer may be presented, the user generated content may be filtered according to product name, words in the question, number of days without responsive content being generated, user generated content submission date, etc. Again, this may be accomplished by searching the user generated content which is associated with both to that manufacturer and any other criteria.

Accordingly, by navigating using the interfaces provided by the portal a user may access user generated content or associated statistics, where the presented user generated content or statistics may be associated with criteria selected from the user. It will be noted that other criteria, or a combination of these, or other, criteria may also be utilized in the determination of user generated content or data to present to the user.

At some point, then, a user associated with the manufacturer may wish to generate content of his own. Thus, one or more interfaces of the manufacturer portal may present a content generation tool to the user. The user may utilize this tool to generate content which can then be incorporated with other user-generated content at the content distribution system for later presentation through a retailer or other site.

Figure 3:
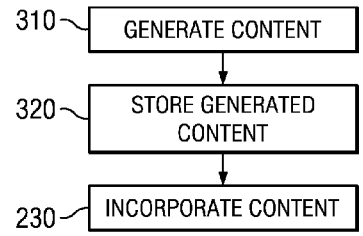
FIG. 3 is a flow diagram of one embodiment of a method for promoting user generation of content.

Moving now to FIG. 3, an embodiment of one method for generating content at a manufacturer portal is depicted. At step 310 a user associated with a manufacturer and utilizing the portal may be presented with a content generation tool or may select to utilize a content generation tool. For example, an interface which presents user generated content associated with that manufacturer to the user may have a link (icon, button, etc.) associated with an original piece of user generated content (in other words, user generated content associated with the manufacturer being presented to the user through the interface). By "clicking" on such a link the user may be presented with the opportunity to generate content using a content generation tool, such that any generated content may be associated with the original user generated content.

The generated content may be received and stored at the content distribution system at step 320. More specifically, the user generated content may be stored in the data store of the content distribution system and associated with any original user generated content to which it may be responsive, a manufacturer identifier of the manufacturer who generated the content, the user identifier of the user who generated the content, a product identifier associated with the manufacturer or a retailer (for example a product identifier utilized by the retailer where the originally generated content was initially generated), a category identifier associated with the manufacturer or a retailer (for example a category identifier utilized by the retailer where the originally generated content was initially generated), attributes of the product, or other desired data which may be provided utilizing a communication received using the manufacturer portal at which the content was generated or determined at the content distribution system.

The user generated content generated at the manufacturer portal may then be incorporated into one or more retailer's sites at step 330. More specifically, in one embodiment, user generated content which is responsive to an original piece of user generated content may be incorporated into the site of the retailer where the original user generated content was generated. For example, if a manufacturer generates an answer that is responsive to a question which was originally generated at a particular retailer's site that answer may be displayed only at that retailer's site. In particular, in one embodiment, the content generated by the manufacturer may be displayed in the same context as the original generated content (for example, on the same pages or in the same location, etc.) and may be displayed in association with the original content.

Thus, it may be apparent that the answer generated by the manufacturer is responsive to the originally generated question. Moreover, such manufacturer generated content may be badged, by including another icon or identifier in association with manufacturer generated content at the retailer's site such that a user viewing the user generated content incorporated at a retailer's site may be made aware that the content was generated by a manufacturer.

Figure 4:
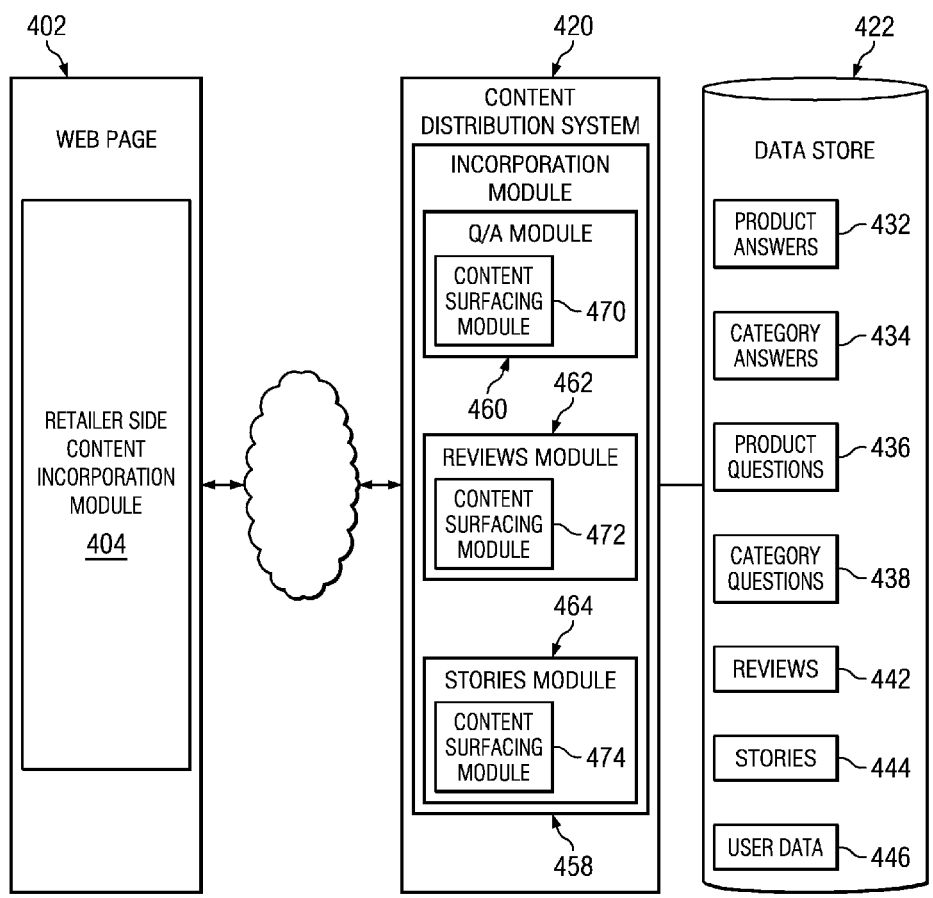
FIG. 4 is a block diagram of an architecture including a content distribution system.

In FIG. 4 an embodiment of one such architecture which may be utilized for the incorporation of user generated content into a web page of the retailer is depicted. Incorporation module 458 at content distribution system 420 may have one or more content generation modules configured to generate specific types of content for incorporation in a retailer's web site including, a question/answer module 460, a reviews module 462, a stories module 464 or any other modules which are desired. Each of these modules 460, 462, 464 may utilize associated data stored in data store 422 to determine which content to provide in response to a request such that appropriate content may be generated in response to a request.

Specifically, data store 422 may comprise user generated data including product answers 432 including a set of answers, each answer associated with the user who generated the answer which may be, for example a manufacturer or user associated with a manufacturer as described above, the associated question, a site on which the answer was generated and a product associated with the question; category answers 434 including a set of answers, each answer associated with the user who generated the answer which may be, for example a manufacturer or user associated with a manufacturer as described above, the associated question, a site on which the answer was generated and a product or category associated with the question; product questions 436 including a set of open questions, each open question associated with a user who generated the question, a site on which the answer was generated and a product to which the question pertains; category questions 438 including a set of open questions, each open question associated with a user who generated the question, a site on which the answer was generated and a product or category to which the question pertains; reviews 442 which may be a review of an associated product generated by an associated user at an associated site; stories 444 including a story about one or more associated products or categories generated by an associated user on an associated site; and user data 446 which may comprise information on users who have generated content with respect to a retailer. It will be noted that these types of data, content, groupings, associations, etc. are provided by way of example only, and that other types of data, content, groupings of content, associations, etc. may be utilized in conjunction with other embodiments.

Additionally, included in the generated content may be a content generation tool configured to allow a user to generate the type of content associated with the module (or another type of content). For example, question/answer module 460 may generate question and answer content and a content generation tool to allow a user to generate questions or answers to one or more questions. This content may be incorporated into a web page to allow a user to view such questions and associated provided answers, to generate new questions or to answer open questions. Any content generated by a user may be communicated back to the module (in this example, question and answer module 460) which may then store the user generated data in data store 422.

Accordingly, as discussed above, a web page 402 at a retailer's site associated with a product or category may include a retailer side content incorporation module 404. This retailer side content incorporation module 404 may be a program which when executed in conjunction with the loading of the web page 402, obtains content from one or more of the content generation modules 460, 462, 464 and incorporates the content into a corresponding portion on the web page 402 configured to display the content. In particular, retailer side content incorporation module 404 may, when the web page 402 is loaded by a user, issue one more calls to a content generation module 460, 462, 464 of incorporation module 458 at a content distribution system 420. A call to a content generation module 460, 462, 464 may include a reference to a product or category associated with the web page 402 such as a product or category identifier. In response to a call from the content incorporation module 404, the called content generation module 460, 462, 464 may generate content of the desired type (including the ability to generate additional content) corresponding to the product or category identified in the call and return this content to the content incorporation module 404 which issued the call.

For example, suppose a user views a web page 402 associated with a particular product. Retailer side content incorporation module 404 may, when the web page 402 is loaded by a user's browser, issue a call to question/answer module 460 referencing the particular product. In response, question/answer module 460 may utilize the identified product, product answers 432, category answers 434, product questions 436, category questions 438, user data 446, etc. to generate question/answer content and return this content to the retailer side content incorporation module 404 along with the ability to generate additional question/answer content, which may include, for example, the ability to ask new questions about the product or category or answer open questions about the product or category. The retailer side content incorporation module 404 may then incorporate the received question/answer content into a portion of the web page 402 configured to display such question/answer content. Since, as discussed above, the product answers 432 or category answers 434 may include answers generated by a user associated with a manufacturer, this manufacturer generated content may be incorporated in the question/answer content generated and returned to the retailer side content incorporation module 404. In particular, in one embodiment the manufacturer generated content may be incorporated in such a way that it is displayed by the retailer side content incorporation module 404 in conjunction with the question to which the manufacturer generated content is responsive.

As it may be desired to incorporate different types of content into various different types of web pages, it should be noted here that various embodiments of a retailer side content incorporation module may call different content generation modules based on what type of web page incorporates the retailer side content distribution module and that additionally, the data included in the call, (for example, a product identifier, category identifier, user identifier, etc.) may likewise differ based on the type of web page, the content generation module called, or a number of other criteria.

It may be useful to the understanding of various embodiments of the content distribution system and manufacturer portal depicted herein to discuss embodiments of various interfaces that may be utilized by an embodiment of a manufacturer portal. Attention is thus directed to FIGS. 5A-9B which presents embodiments of such interfaces.

Figure 5A:
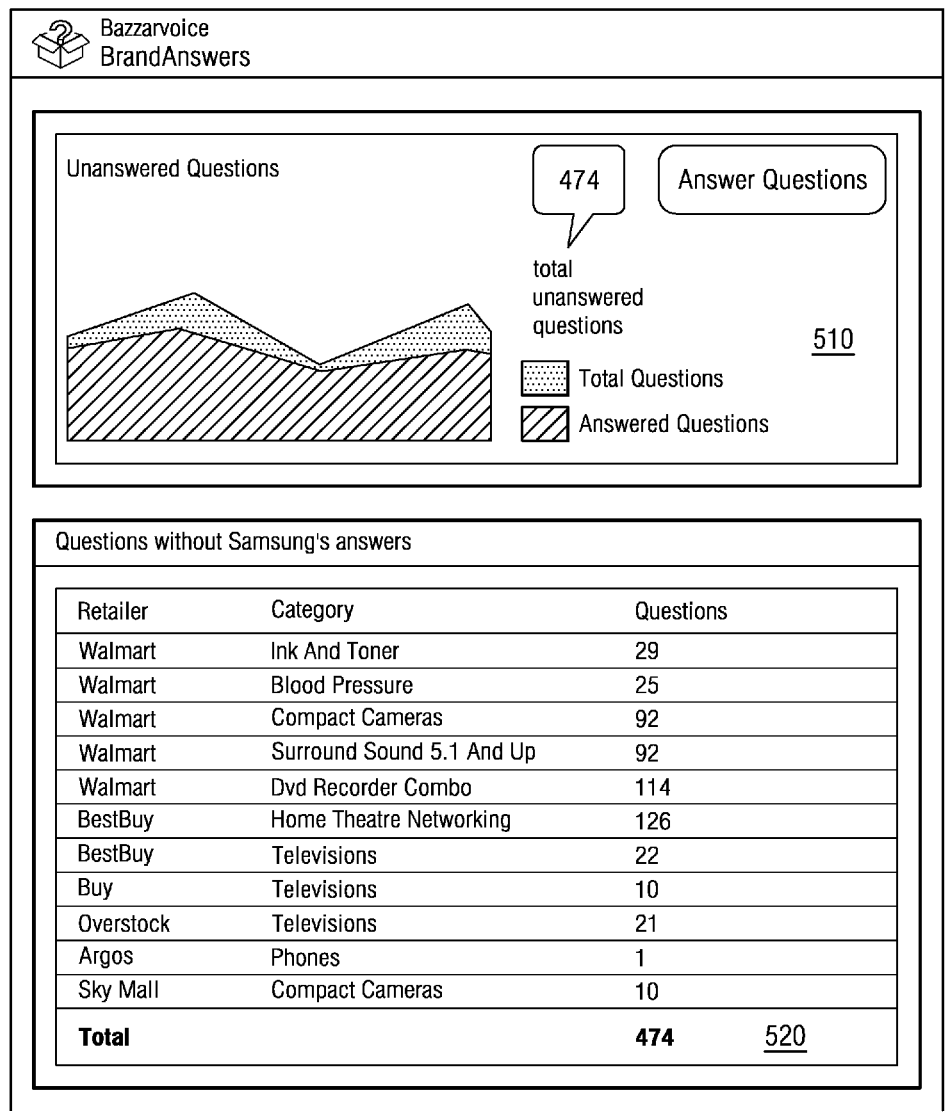
FIG. 5A is a depiction of one embodiment of an interface which may be utilized with a manufacturer portal.
Figure 5B:
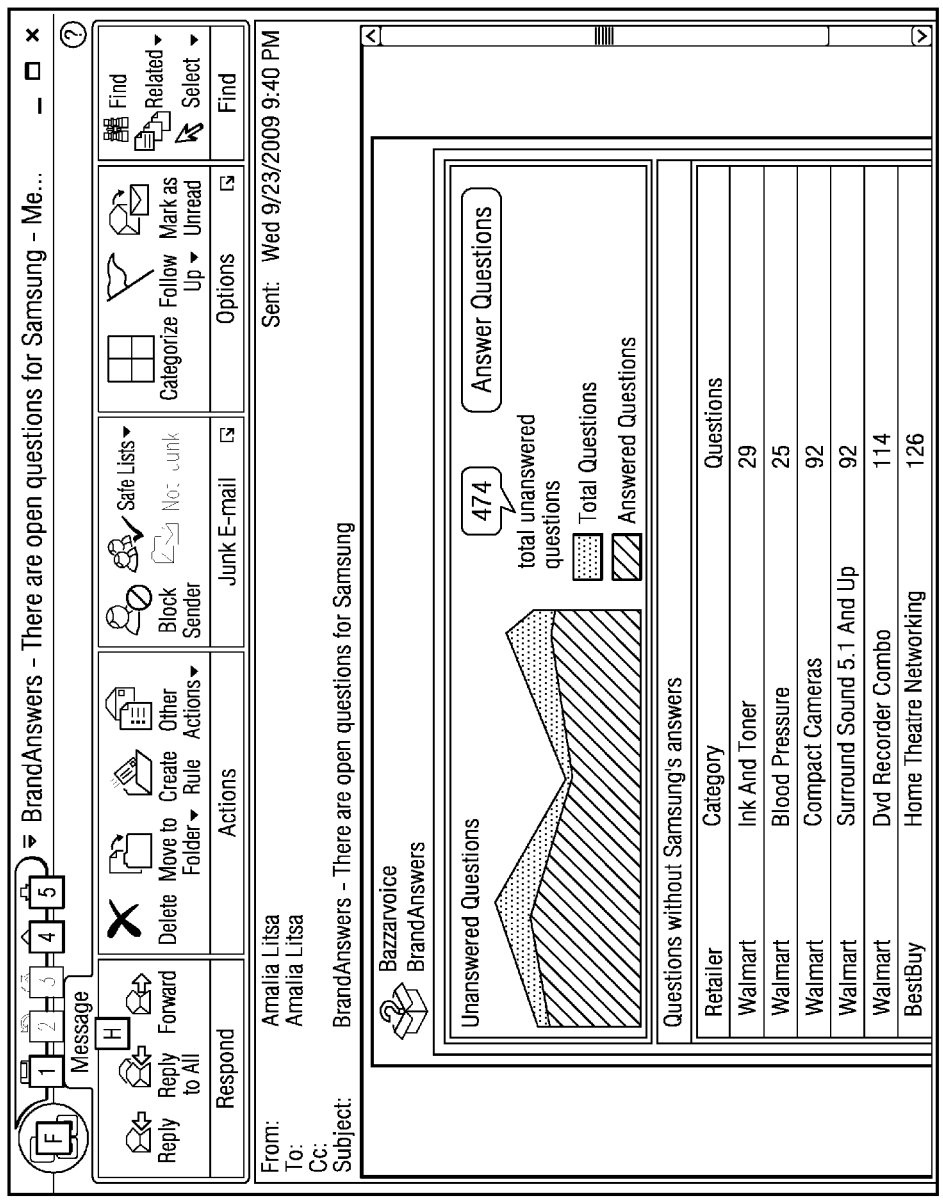
FIG. 5B is a depiction of one embodiment of an interface which may be utilized with a manufacturer portal.

More specifically FIGS. 5A and 5B depict one embodiment of an alert that may be sent to a manufacturer to alert a user at the manufacturer that new content related to the manufacturer has been generated at a retailer's site. Specifically, here the interface may specify that one or more new questions has been generated at a retailer's site or that one or more open questions associated with the manufacturer may still exist. With reference to FIG. 5A, one area 510 of the presented interface may present a graphical depiction of the number of questions asked and answered and a total number of unanswered questions along with a link providing access to the manufacturer portal. One area 520 may present open questions in categories of products offered by the manufacturer, where the number of open questions are further broken down by individual retailers which see the categories of products.

Figure 5C:
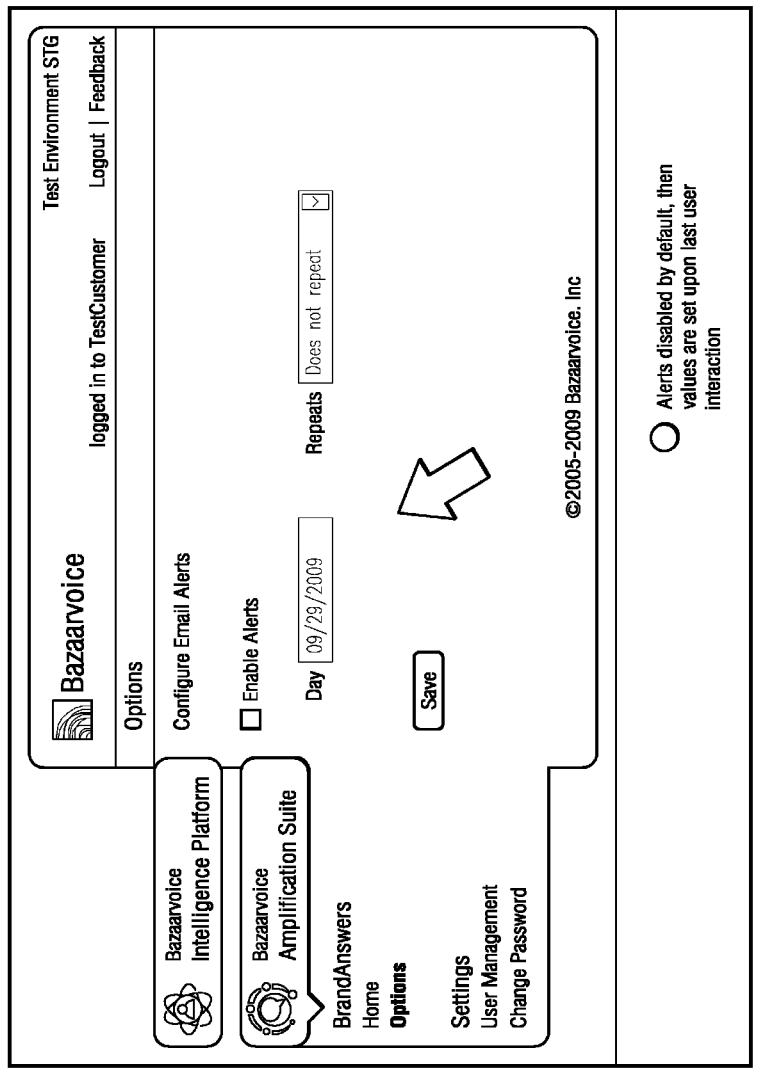
FIG. 5C is a depiction of one embodiment of an interface which may be utilized with a manufacturer portal.
Figure 5D:
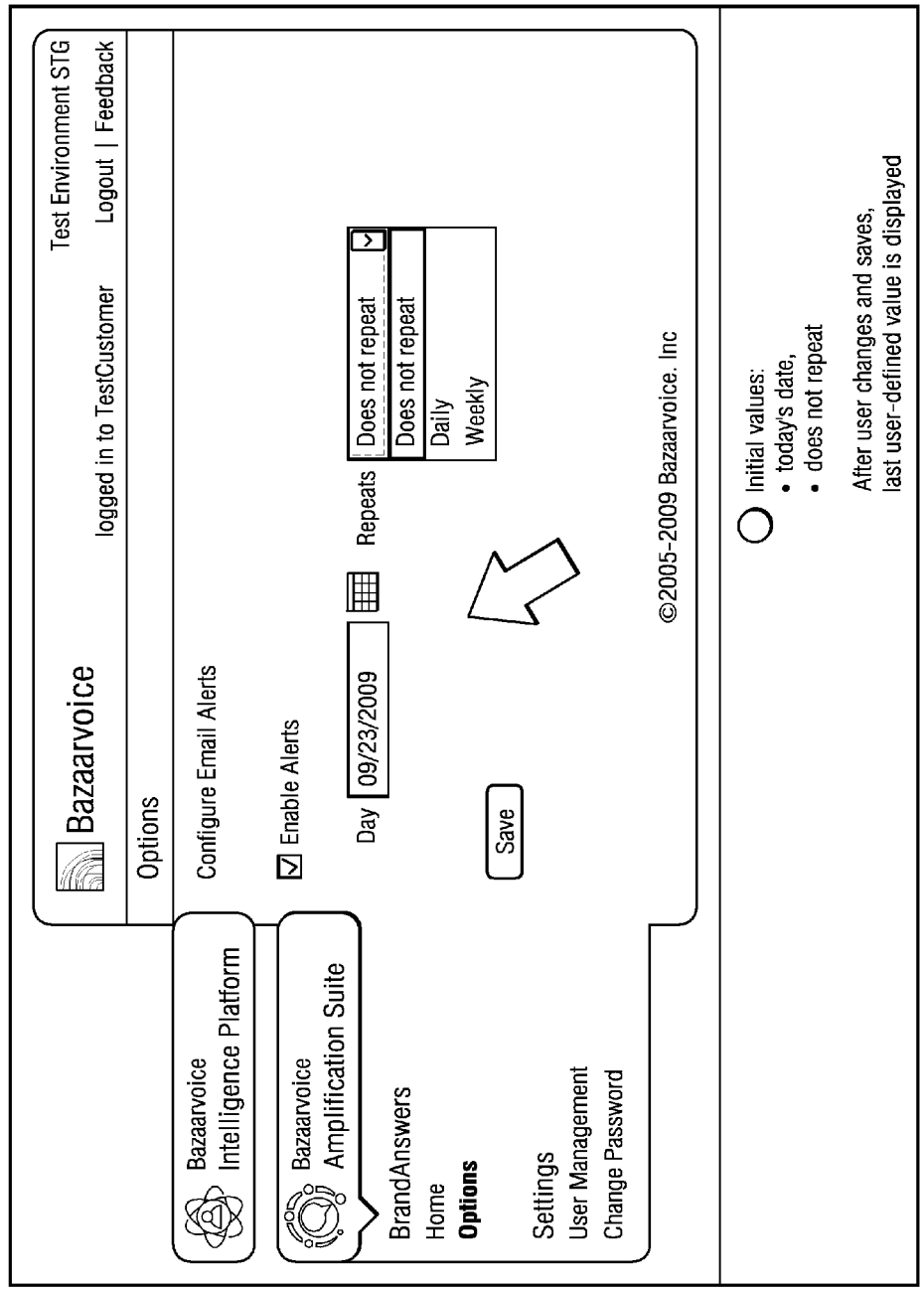
FIG. 5D is a depiction of one embodiment of an interface which may be utilized with a manufacturer portal.

As can be seen in FIG. 5B, such an alert may be provided to a manufacturer in one or more emails that may be sent to email addresses configured by the manufacturer at one or more time periods configured by the manufacturer. FIGS. 5C and 5D present embodiments of interface which may used by a manufacturer to configure such alerts. These interfaces may, for example, be presented in conjunction with the manufacturer portal itself.

Figure 6:
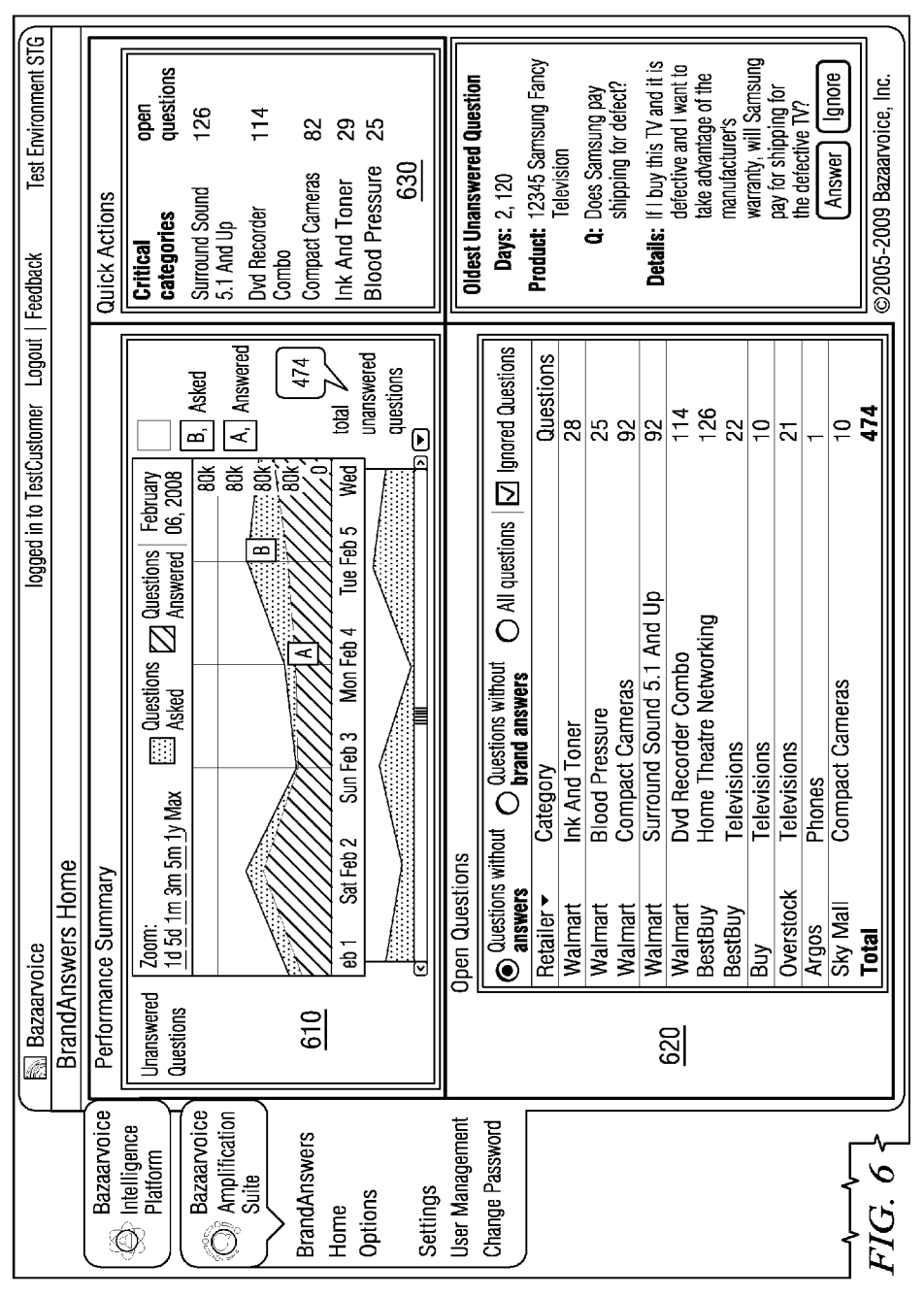

Based on an alert, or of their own volition, a user associated with the manufacturer may then choose to access the manufacturer portal. This access may occur, for example, by clicking the link provided in the alert. FIG. 6 depicts one embodiment of an interface which may be presented to a user affiliated with a manufacturer when the user logs into the manufacturer portal. One area 610 of the presented interface may comprise a performance summary which presents the number of questions asked and answered by time period and a total number of unanswered questions. One area 620 may present open questions in categories of products offered by the manufacturer, where the number of open questions are further broken down by individual retailers which see the categories of products. Thus, for example, there may be 25 open questions associated with category identifier "Blood Pressure" which have been generated in association with the retailer "Walmart" (for example, at a site provided by "Walmart"). Notice here, that area 620 may present the user with ability to select one or more criteria which may be used by the manufacturer portal to present data, including for example "Retailer", "Category", "Questions" (for example, sort by the number of open questions), type of questions (those with or without answers provided by a manufacturer), etc. Area 630 presents the number of open questions in categories deemed "Critical." These critical categories, and their priority, may have been defined by the manufacturer using the manufacturer portal, or some other method, at an earlier time.

Figure 7:
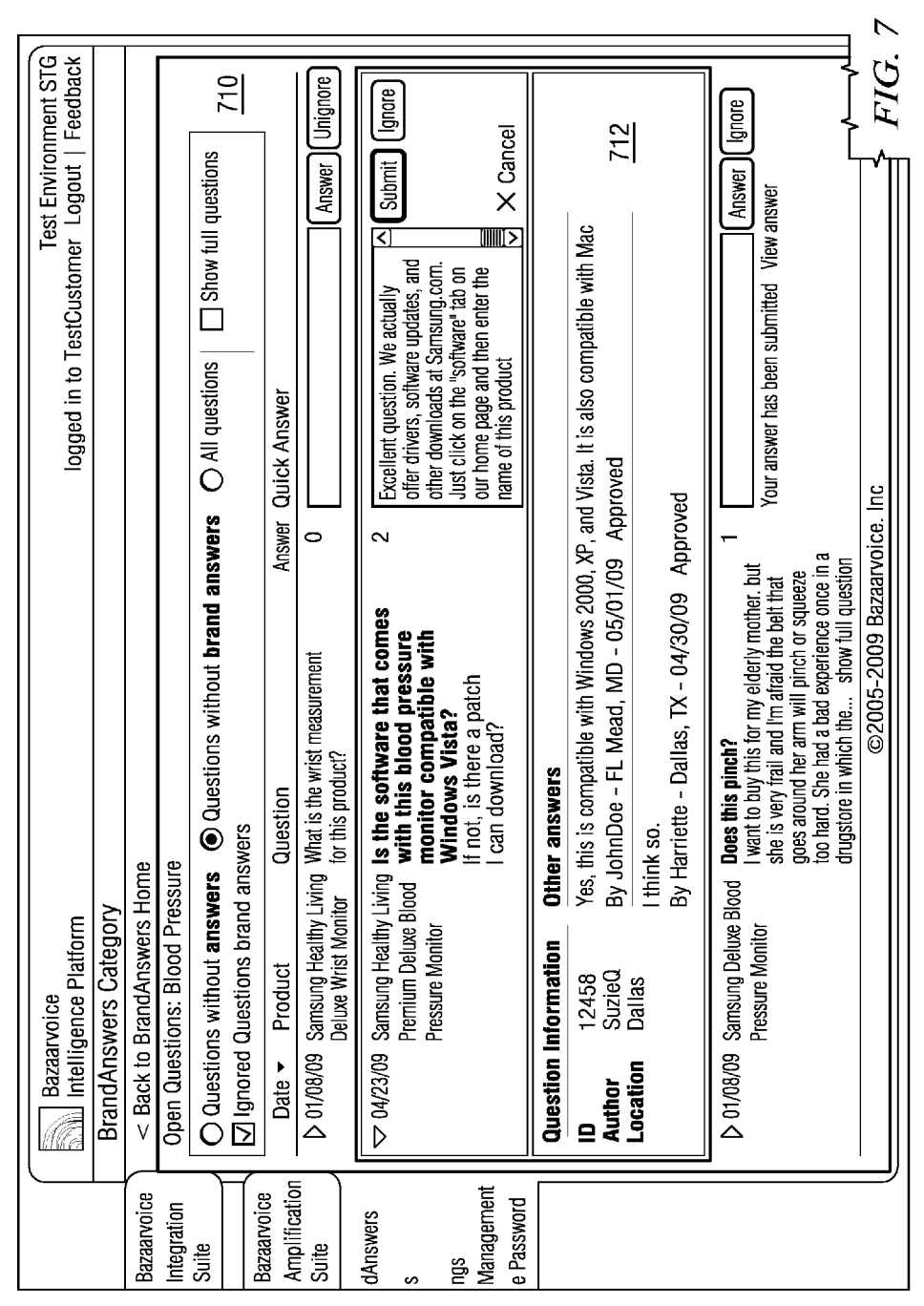

A user may thus choose to be presented with questions associated with a particular category. The user may thus select a particular category in the interface. FIG. 7 depicts one embodiment of an interface that may be presented to a user when the category "Blood Pressure" is selected from the "Category" list as presented in the interface of FIG. 6. Here area 710 may present a list of each piece of user generated content associated with the category where each entry includes the actual content of each of the pieces of user generated content. In this case, each entry may comprise the actual question that was generated by a user at a retailer site. Each entry may also be associated with the date on which the associated user generated content was originally generated, the product with which the user generated content is associated, the number of answers that have been provided by other users or other desired information. Each entry may also be expanded utilizing the interface such that the expanded entry may comprise additional information related to the user generated content such as identifier for the user who generated the content, the user's location or other responsive user generated content including other answers if the originally generated user content is a question. Entry 712 in this example has been expanded.

Each entry may also be associated with a content generation tool where content responsive to the user generated content associated with that entry may be generated and submitted. This content generation tool may be activated by, for example, selecting the "answer" link presented in the entry. Here, for example, the "answer" link associated with entry 712 has been selected and the content generation tool presented in expanded entry 712 has had user generated content entered into the tool. A link is then presented by which the responsive user generated content may be submitted to the content distribution system.

Figure 8A:
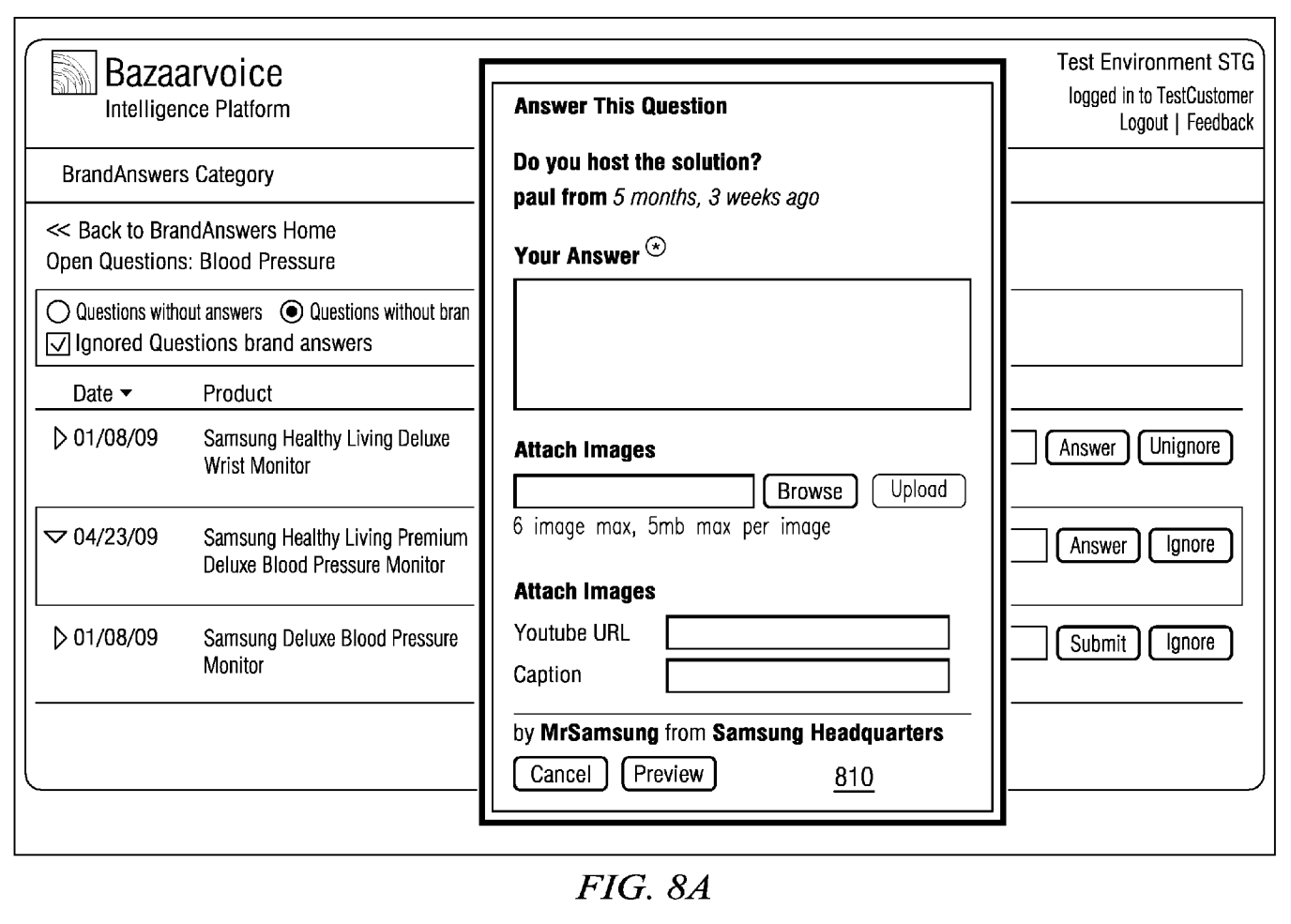
Figure 8B:
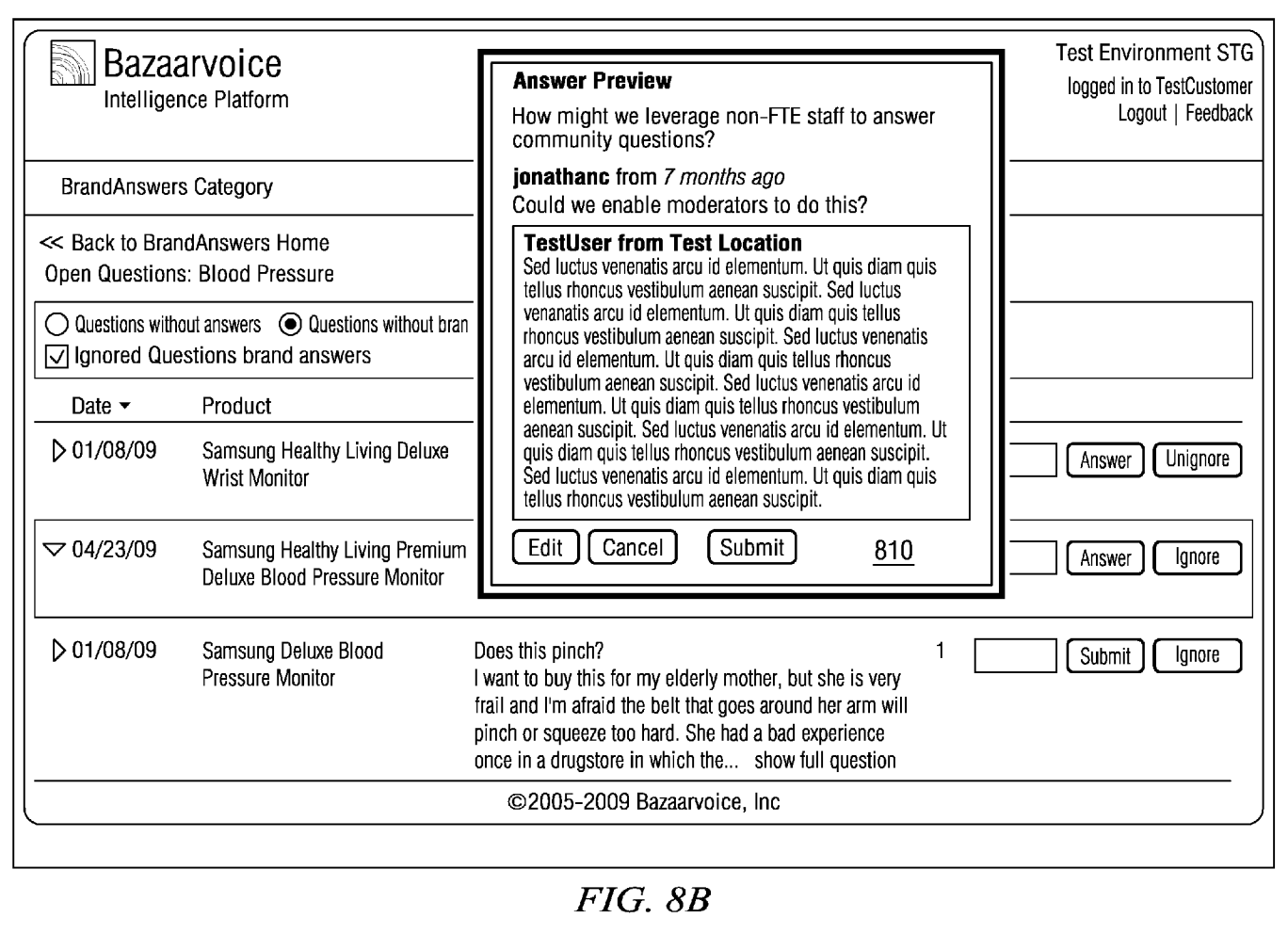

FIGS. 8A and 8B present embodiments of additional interfaces which may be utilized to generate responsive content. Referring first to FIG. 8A a user may select an "answer" link associated with an entry as depicted in FIG. 7. The selection of this link may result in content generation tool 810 being presented to a user. The user may then generate various content and provide associate information such as images or links to other sites. Using the tool 810 the user may then preview how his user generated content will appear at a retailer's site as depicted in FIG. 8B. The user may then choose to submit the content which he generated.

Figure 8C:
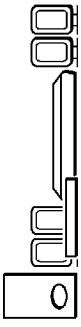
FIG. 8C is a depiction of one embodiment of an interface which may be utilized at a retailer's site.

FIG. 8C presents an embodiment of interface which may be presented at a retailer's site to allow a user of that retailer's site to generate content intended for a manufacturer, where this generated content may be presented to the manufacturer through the manufacturer's portal. Here, in area 820 of the interface an invitation to generate content intended for a manufacturer may be presented. By selecting a link associated with this area 820 a content generation tool may be presented to the user, where content generated utilizing such a tool may be presented to the manufacturer through the manufacturer portal as illustrated above and may be answered or responded to by the manufacturer using an interface such as that depicted above with respect to FIGS. 8A and 8B.

Figure 9B:
FIG. 9B is a depiction of one embodiment of an interface which may be utilized at a retailer's site.

Once content responsive to user generated content is generated by a manufacturer, this responsive user generated content may be presented to a user at a different web site such as the retailer's site where the original user generated content was generated. FIGS. 9A and 9B depict embodiments of the presentation of manufacturer generated content in conjunction with originally generated content to which it is responsive. In both examples a manufacturer has generated an answer to a user generated question and this answer is presented in conjunction with the original question at the retailer's site where the question was originally generated. Note in the embodiments depicted an identifier (referred to as a badge) has been presented in conjunction with the manufacturer generated answer to identify that answer being presented was generated by the manufacturer. For example, badge 910 identifies that the answer was provided by "Hewlett Packard" and badge 920 identifies that the answer was provided by "Samsung."

In the foregoing specification, the invention has been described with reference to specific embodiments. However, one of ordinary skill in the art appreciates that various modifications and changes can be made without departing from the scope of the invention as set forth. Accordingly, the specification, appendices and figures are to be regarded in an illustrative rather than a restrictive sense, and all such modifications are intended to be included within the scope of invention, notwithstanding the use of any restrictive terms.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method, comprising:
   receiving, by a computer system, user generated content relating to a plurality of products, wherein the received user generated content includes individual items respectively collected using a plurality of web sites via which individual ones of the plurality of products are offered for sale, and wherein the plurality of web sites correspond to a plurality of sellers;
   receiving, by the computer system, one or more criteria specified by a particular supplier of one or more particular products;
   the computer system determining that a particular item of the user generated content includes a question that relates to the one or more particular products and also satisfies the one or more criteria, wherein the particular item of the user generated content corresponds to a particular web site of the plurality of web sites;
   based on determining that the particular item of the user generated content includes the question, the computer system providing the particular item of the user generated content to the particular supplier; and
   causing, by the computer system, supplier generated content from the particular supplier to be displayed, at the particular web site, in association with the question included in the particular item of the user generated content.

2. The method of claim 1, wherein the user generated content comprises product reviews that are collected from consumers browsing the one or more particular products at one or more of the plurality of web sites.

3. The method of claim 1, further comprising:
   based on determining that a different particular item of the user generated content does not include any questions, the computer system filtering the different particular item of user generated content out from a set of user generated content to be provided to the particular supplier, wherein the set includes the particular item.

4. The method of claim 1, wherein providing the particular item of the user generated content is based on a determination that the question has no corresponding answers on the particular web site.

5. The method of claim 1,
   wherein the supplier generated content comprises one or more associated answers from the particular supplier for one or more questions.

6. The method of claim 1, wherein the one or more criteria specified by the particular supplier include a requirement that the question is unanswered.

7. The method of claim 1,
   wherein the one or more criteria specified by the particular supplier include one or more identifiers of the one or more particular products.

8. The method of claim 1, wherein the plurality of sellers includes the particular supplier and one or more other entities that sell the particular item.

9. The method of claim 1, wherein the plurality of sellers does not include the particular supplier.

10. A non-transitory computer-readable medium having stored thereon instructions executable by a computer system to cause the computer system to perform operations comprising:
    receiving user generated content relating to a plurality of products, wherein the received user generated content includes individual items respectively collected using a plurality of web sites via which individual ones of the plurality of products are offered for sale, and wherein the plurality of web sites correspond to a plurality of sellers;
    determining that one or more criteria specified by a particular supplier of one or more particular products are satisfied by a particular item of the user generated content that relates to the one or more particular products, wherein the particular item of the user generated content corresponds to a particular web site of the plurality of web sites, and wherein the one or more criteria include a requirement that a question be present in the user generated content;
    providing the particular item of the user generated content to the particular supplier; and
    causing supplier generated content related to the particular item of the user generated content to be transmitted to a user device.

11. The non-transitory computer-readable medium of claim 10, wherein receiving the user generated content comprises receiving product reviews collected from consumers browsing the one or more particular products at the one or more of the plurality of web sites.

12. The non-transitory computer-readable medium of claim 11, wherein the consumers browsing the one or more particular products include one or more purchasers of the one or more particular products.

13. The non-transitory computer-readable medium of claim 10, wherein the one or more criteria specified by the particular supplier include a requirement that that the question is unanswered.

14. The non-transitory computer-readable medium of claim 13, wherein the one or more criteria specified by the particular supplier include a requirement that that the question has fewer than a threshold number of answers.

15. The non-transitory computer-readable medium of claim 10, wherein the one or more criteria specified by the particular supplier include an identifier of the particular supplier.

16. The non-transitory computer-readable medium of claim 10, wherein the one or more criteria specified by the particular supplier include an identifier of the one or more particular products.

17. The non-transitory computer-readable medium of claim 10, wherein the plurality of sellers includes the particular supplier and one or more other entities that sell the particular item.

18. The non-transitory computer-readable medium of claim 10, wherein the plurality of sellers does not include the particular supplier.

19. A system, comprising:
    one or more processors; and
    non-transitory memory coupled to the one or more processors, wherein the memory stores instructions executable by the system to cause the system to perform operations that include:
      receiving user generated content relating to a plurality of products, wherein the received user generated content includes individual items respectively collected using a plurality of web sites via which individual ones of the plurality of products are offered for sale, and wherein the plurality of web sites correspond to a plurality of sellers;
      receiving one or more criteria from a particular supplier;
      determining that a particular item of the user generated content includes a question that relates to one or more particular products that correspond to the particular supplier and also satisfies the one or more criteria, wherein the particular item of the user generated content corresponds to a particular web site of the plurality of web sites;

based on determining that the particular item of the user generated content includes the question, providing the particular item of the user generated content to the particular supplier;

receiving supplier generated content from the particular supplier that corresponds to the particular item of the user generated content; and associating the received supplier generated content with the particular item of the user generated content, wherein the associating is configured to facilitate display of the received supplier generated content in connection with the particular item of the user generated content at the particular web site.

20. The system of claim 19, wherein the user generated content comprises product reviews that are collected from consumers browsing the one or more particular products at the one or more of the plurality of web sites.

21. The system of claim 20, wherein the operations further comprise the system filtering out a different particular item of user generated content from a set of user generated content to be provided to the particular supplier based on the different particular item not having any questions.

22. The system of claim 19, wherein the one or more criteria specified by the particular supplier include a requirement that the question is unanswered by the particular supplier.

23. The system of claim 19, wherein the one or more criteria is an identifier of the particular supplier; and wherein the determining that the particular item of the user generated content satisfies the one or more criteria includes determining that the one or more particular products correspond to the particular supplier.

24. The system of claim 19, wherein the one or more criteria is an identifier of the one or more particular products; and wherein the determining that the particular item of the user generated content satisfies the one or more criteria includes determining that the one or more particular products correspond to the particular supplier.

25. The system of claim 19, wherein the plurality of sellers includes the particular supplier and one or more other entities that sell the particular item.

26. The system of claim 19, wherein the plurality of sellers does not include the particular supplier.

* * * * *